US012565077B1

(12) United States Patent
    Park et al.

(10) Patent No.: US 12,565,077 B1
(45) Date of Patent: Mar. 3, 2026

(54) SUSPENSION APPARATUS

(71) Applicant: HYUNDAI MOBIS CO., LTD., Seoul (KR)

(72) Inventors: Hye Chan Park, Yongin-si (KR); Hyun Jin Woo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/172,945

(22) Filed: Apr. 8, 2025

(30) Foreign Application Priority Data

Sep. 2, 2024   (KR) ......................... 10-2024-0118638

(51) Int. Cl.
    *B60G 21/05* (2006.01)
    *B60G 7/00* (2006.01)

(52) U.S. Cl.
    CPC ........... *B60G 21/051* (2013.01); *B60G 7/005* (2013.01); *B60G 2200/21* (2013.01); *B60G 2200/44* (2013.01); *B60G 2204/1246* (2013.01)

(58) Field of Classification Search
    CPC .. B60G 21/051; B60G 7/005; B60G 2200/21; B60G 2200/44; B60G 2204/1246
    See application file for complete search history.

(56) References Cited

U.S. PATENT DOCUMENTS

| | | | | |
|---|---|---|---|---|
| 4,655,467 A | * | 4/1987 | Kitzmiller ............ | B60G 11/225 280/124.128 |
| 5,839,741 A | * | 11/1998 | Heyring ................. | B60G 21/04 280/124.167 |
| 6,267,397 B1 | * | 7/2001 | Hamada ............... | B60G 21/051 280/124.128 |
| 9,079,473 B2 | * | 7/2015 | Lee ....................... | B60G 21/052 |
| 9,399,384 B2 | * | 7/2016 | Lee ....................... | B60G 21/007 |
| 2004/0160033 A1 | * | 8/2004 | Kawamata ............. | B60G 7/006 280/124.166 |
| 2008/0111336 A1 | * | 5/2008 | Aubarede .............. | B60G 7/008 280/124.128 |
| 2013/0056947 A1 | * | 3/2013 | Moon ................... | B60G 21/051 280/124.128 |
| 2013/0062849 A1 | * | 3/2013 | Kim ..................... | B60G 21/051 280/93.511 |
| 2013/0062850 A1 | * | 3/2013 | Kim ..................... | B60G 21/051 280/93.511 |
| 2015/0123370 A1 | * | 5/2015 | Lee ....................... | B60G 21/052 280/124.128 |
| 2019/0161114 A1 | * | 5/2019 | Yamazaki ................ | B62D 7/16 |
| 2021/0155283 A1 | * | 5/2021 | Sakagami ............ | B62D 5/0418 |
| 2022/0219503 A1 | * | 7/2022 | Niessing .............. | B60G 21/051 |
| 2024/0416709 A1 | * | 12/2024 | Woo ........................ | B60G 7/008 |

FOREIGN PATENT DOCUMENTS

KR    10-2022-0162460 A    12/2022

* cited by examiner

*Primary Examiner* — Toan C To

(74) *Attorney, Agent, or Firm* — NSIP Law

(57) ABSTRACT

A suspension apparatus includes a carrier connected to a wheel, a torsion beam axle connected to a vehicle body to rotatably support the carrier, and a steering component connected to the carrier to rotate the carrier relative to the torsion beam axle.

15 Claims, 12 Drawing Sheets

SUSPENSION APPARATUS

CROSS-REFERENCE TO RELATED APPLICATION

This application claims priority from and the benefit of Korean Patent Application No. 10-2024-0118638, filed on Sep. 2, 2024, which is hereby incorporated by reference for all purposes as if set forth herein.

BACKGROUND

Field

The present disclosure relates to a suspension apparatus, and more particularly, to a rear-wheel suspension apparatus for electric vehicles.

Discussion of the Background

Generally, a suspension for vehicles is an apparatus that connects an axle to a vehicle body, preventing vibrations or shocks received from a road surface during driving from being directly transmitted to the vehicle body, thereby preventing damage to the vehicle body or cargo, and improving ride comfort.

Recently, the development of eco-friendly vehicles, including electric vehicles, has been increasing. With regard to electric vehicles, active development is in progress for a suspension apparatus capable of securing space for accommodating a high-capacity battery to increase the all-electric range (AER).

A related art of the present disclosure has been disclosed in Korean Patent Publication No. 10-2022-0162460 (published on Dec. 8, 2022, entitled "TORSION BEAM AXLE DEVICE FOR VEHICLE").

SUMMARY

Various embodiments are directed to providing a suspension apparatus capable of rear-wheel steering.

A suspension apparatus according to an embodiment of the present disclosure include: a carrier connected to a wheel; a torsion beam axle connected to a vehicle body, and configured to rotatably support the carrier; and a steering component connected to the carrier, and configured to rotate the carrier relative to the torsion beam axle.

The torsion beam axle may include: a torsion bar spaced apart from the carrier, and disposed parallel to a width direction of the vehicle body; a first trailing arm extending form the torsion bar, and connected to the vehicle body; a second trailing arm extending from the torsion bar, and disposed to face the carrier; and a steering joint disposed between the carrier and the second trailing arm.

The torsion bar may be disposed behind the carrier.

The steering joint may include a ball joint.

The steering component may include: a steering actuator spaced apart from the carrier, and configured to generate a driving force; a tie rod disposed between the steering actuator and the carrier, and configured to receive the driving force from the steering actuator and to reciprocate; and a conversion joint disposed between the carrier and the tie rod, and configured to convert the reciprocation of the tie rod into a rotational motion of the carrier.

The tie rod may be disposed parallel to the torsion bar.

The conversion joint may include a ball joint.

A central axis of the steering joint may be parallel to a center axis of the conversion joint.

The suspension apparatus may further include a shock absorber including a first connection portion connected to the carrier and a second connection portion connected to the vehicle body.

At least one of the first connection portion and the second connection portion may include a ball joint.

The suspension apparatus may further include an elastic element disposed between the carrier and the vehicle body, and configured to elastically support the carrier with respect to the vehicle body.

The carrier may include: a first carrier body disposed to face the wheel; and a second carrier body extending form the first carrier body, and including a seating recess in which an end of the elastic element is seated.

The suspension apparatus may further include a bearing configured to rotatably support the elastic element with respect to the vehicle body.

The suspension apparatus may further include: a link arm disposed to face the torsion beam axle with the carrier interposed therebetween; and a link joint disposed between the link arm and the carrier.

The link joint may include a ball joint.

DETAILED DESCRIPTION

Figure 1:
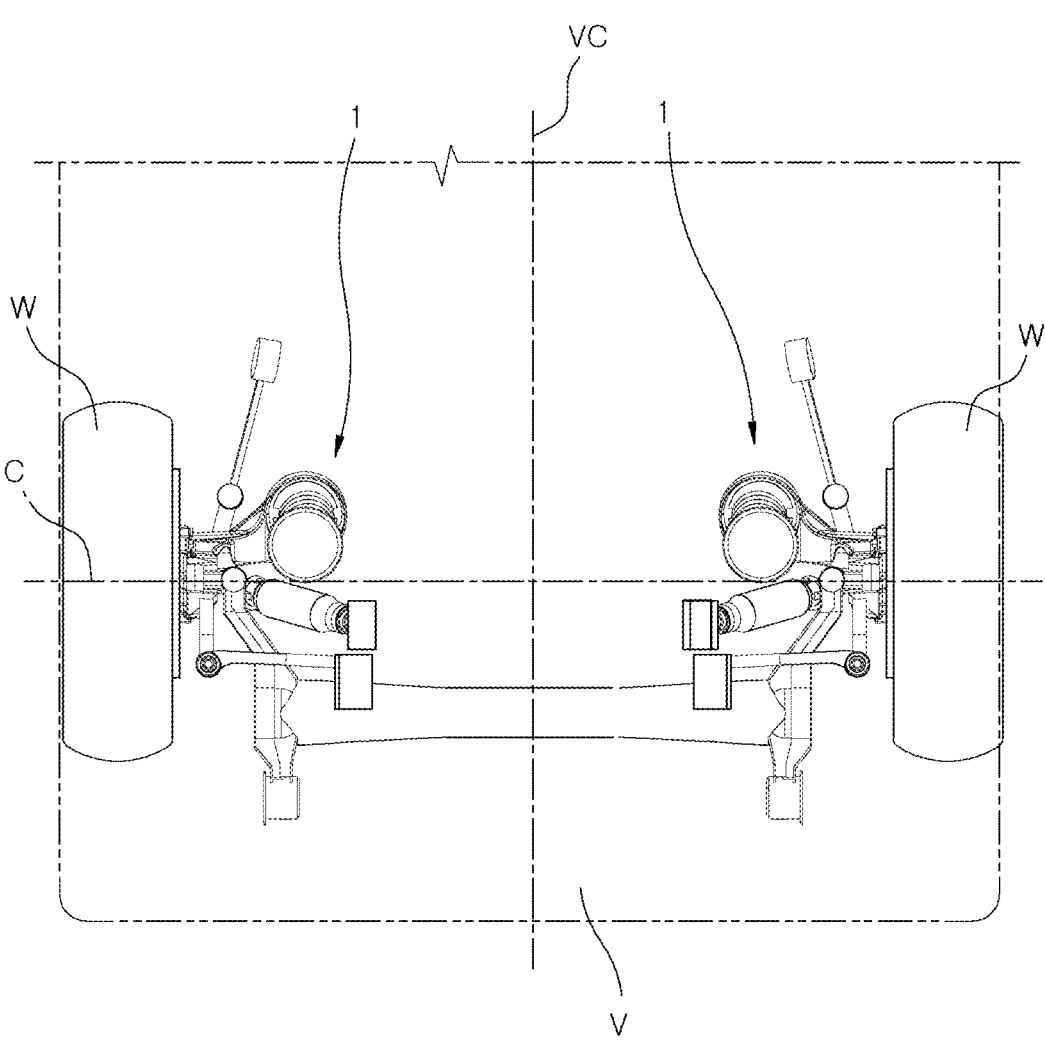
FIG. 1 is a diagram schematically illustrating an installation state of a suspension apparatus according to an embodiment of the present disclosure.
Figure 1:
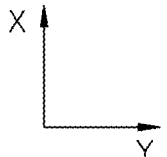

Hereinafter, embodiments of the present disclosure will be described with reference to the accompanying drawings.

It should be noted that the drawings are not to precise scale and may be exaggerated in thickness of lines or sizes of components for descriptive convenience and clarity only. Furthermore, the terms as used herein are defined by taking functions of the present disclosure into account and may be changed according to the custom or intention of passengers or operators. Therefore, definition of the terms should be made according to the overall disclosures set forth herein.

Throughout the specification, when a component is described as being "connected to," or "coupled to" another component, it may be directly "connected to," or "coupled to" the other component, or there may be one or more other components intervening therebetween. In this specification, when a part "includes," or "has" a component, unless there is a particular description contrary thereto, the part can further "include," or "have" other components, not excluding the other components.

Throughout this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. In addition, the number, shape, size, and relative differences in size of detailed components included in the drawings of the present application are set for convenience of description, and do not limit embodiments but may be implemented in various forms.

Figure 2:
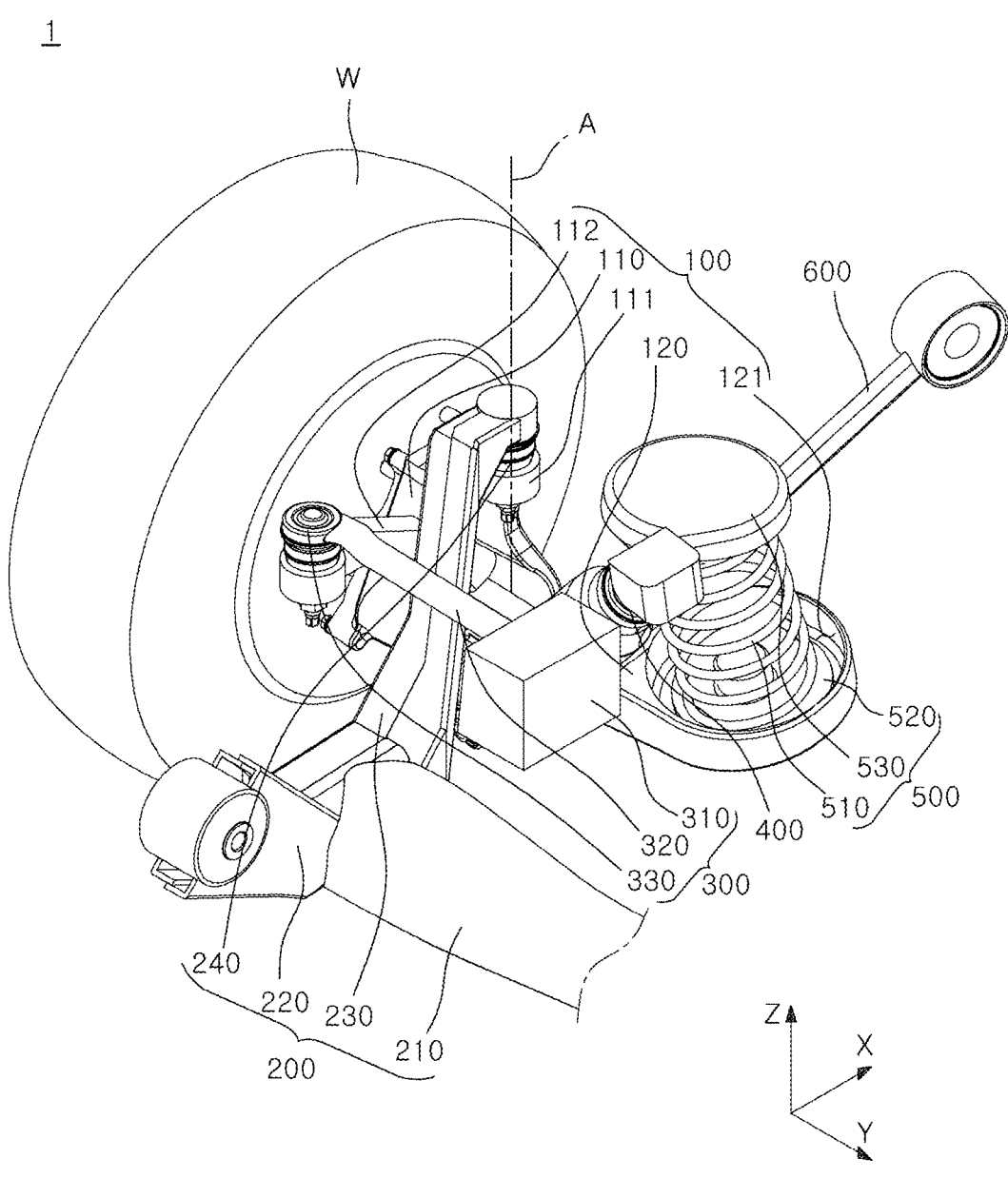
FIG. 2 is a perspective view schematically illustrating a configuration of the suspension apparatus according to an embodiment of the present disclosure.
Figure 3:
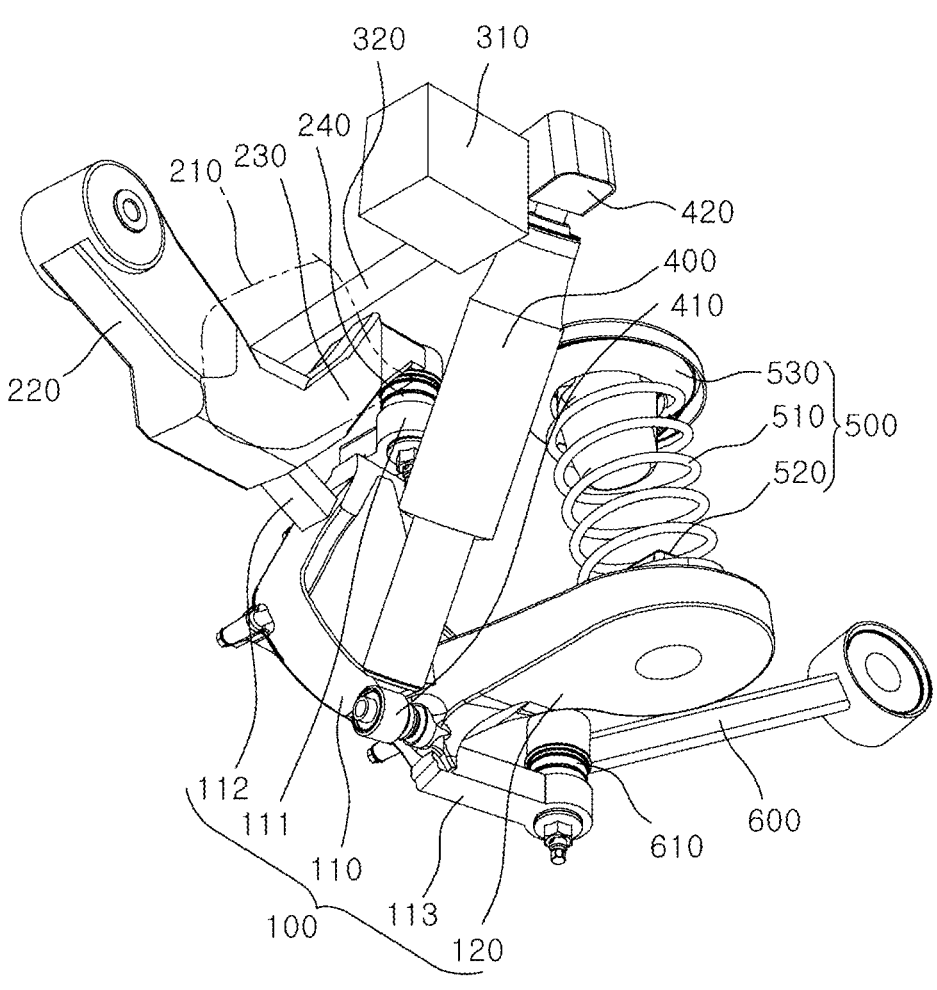
FIG. 3 is a bottom perspective view schematically illustrating a configuration of the suspension apparatus according to an embodiment of the present disclosure.
Figure 4:
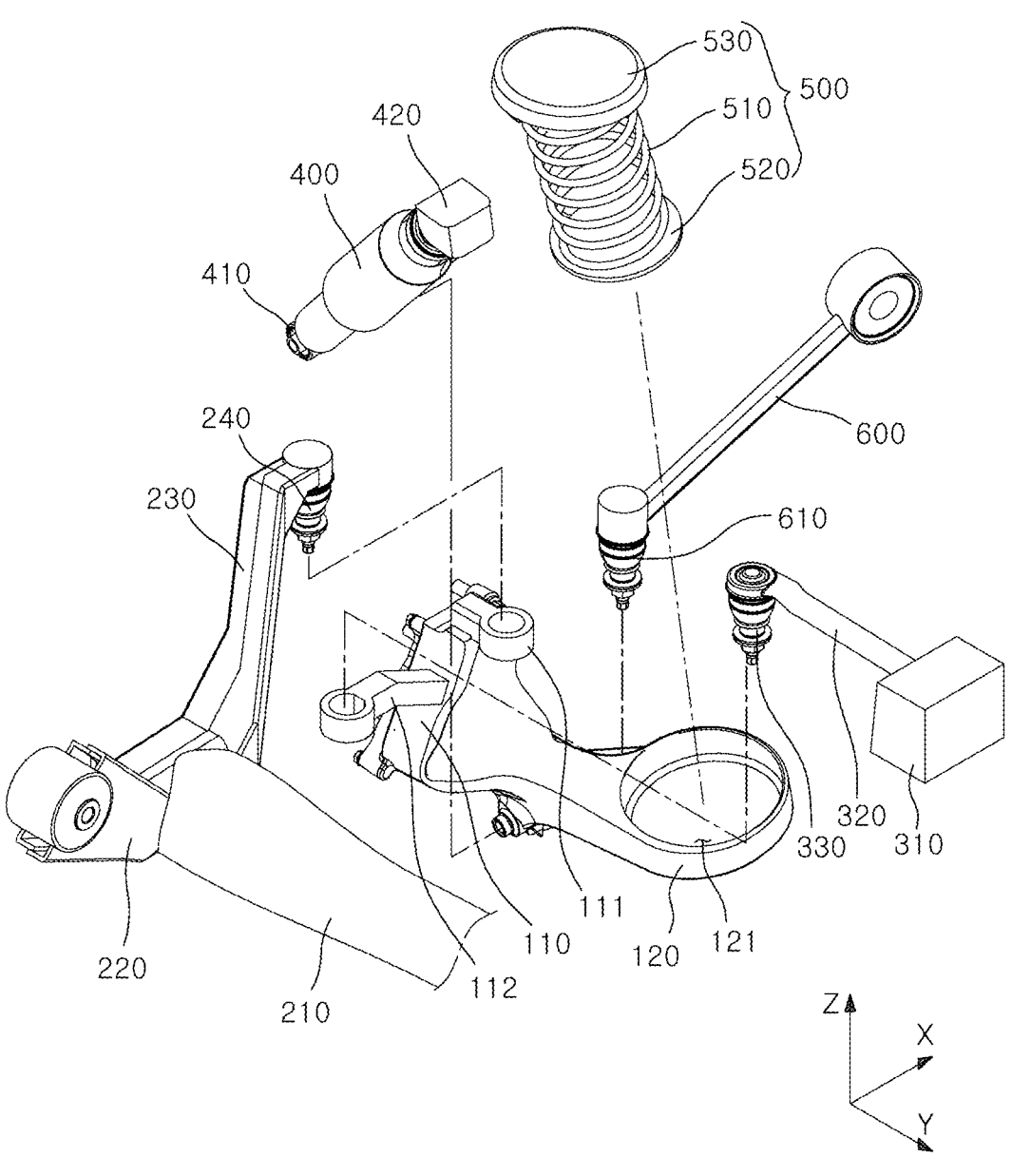
FIG. 4 is an exploded perspective view schematically illustrating a configuration of the suspension apparatus according to an embodiment of the present disclosure.

FIG. 1 is a diagram schematically illustrating an installation state of a suspension apparatus according to an embodiment of the present disclosure. FIG. 2 is a perspective view schematically illustrating a configuration of the suspension apparatus according to an embodiment of the present disclosure. FIG. 3 is a bottom perspective view schematically illustrating a configuration of the suspension apparatus according to an embodiment of the present disclosure. FIG. 4 is an exploded perspective view schematically illustrating a configuration of the suspension apparatus according to an embodiment of the present disclosure.

A vehicle body V described below may refer to various structures that form a structural framework of a vehicle, such as a frame body, a subframe, or a body shell. Hereinafter, a longitudinal direction of the vehicle body V refers to a direction parallel to a Y-axis based on FIG. 1, and a width direction of the vehicle body V refers to a direction parallel to an X-axis based on FIG. 2, as an example for explanation.

In addition, a wheel W described hereinafter may refer to a rear wheel of a vehicle. A central axis C of the wheel W may be arranged parallel to the width direction of the vehicle body V.

Referring to FIGS. 1 to 4, a suspension apparatus 1 according to an embodiment may be disposed between a pair of wheels W spaced apart in the width direction of the vehicle body V. As the wheels W are exemplified as rear wheels of the vehicle, the suspension apparatus 1 may be positioned at a rear side of the vehicle body V. The suspension apparatus 1 may provide a mechanical connection between the wheels W and the vehicle body V, and function as a configuration that performs suspension and steering operations for each wheel W.

The suspension apparatus 1 according to the present embodiment includes a carrier 100, a torsion beam axle 200, and a steering component 300.

The carrier 100 may be connected to the wheel W that is rotatably installed at a lower side of the vehicle body V. The carrier 100 may function as a configuration that provides a mechanical connection of various suspension components, such as the torsion beam axle 200, between the vehicle body V and the wheel W. The carrier 100 may rotate together with the wheel W about a steering axis A during a steering operation of the wheel W. Hereinafter, the steering axis A will be described as being parallel to a Z-axis perpendicular to a ground surface as an example. However, the steering axis A is not limited thereto and may be arranged to be inclined at a predetermined angle with respect to the ground surface.

The carrier 100 may be provided as a pair. The pair of carriers 100 may be respectively individually connected to the pair of wheels W that are disposed to face each other in the width direction of the vehicle body V.

The carrier 100 according to the present embodiment may include a first carrier body 110 and a second carrier body 120.

The first carrier body 110 may form an external shape of a first side of the carrier 100, and may rotatably support the corresponding wheel W.

The first carrier body 110 according to the present embodiment may be disposed to face the wheel W in the width direction of the vehicle body V. The first carrier body 110 may be spaced apart from an inner surface of the wheel W by a predetermined distance in the width direction of the vehicle body V. The inner surface of the wheel W may refer to the surfaces on which the pair of wheels W, spaced apart in the width direction of the vehicle body V, face each other.

The first carrier body 110 may rotatably support the wheel W about the central axis C of the wheel W. For example, the first carrier body 110 may be connected to the wheel W by a wheel bearing. The specific shape of the first carrier body 110 is not limited to the shapes shown in FIGS. 2 to 4, and may be modified into various shapes through design changes.

The first carrier body 110 may be provided with a first coupling portion 111 and a second coupling portion 112.

The first coupling portion 111 may provide a connection point of the torsion beam axle 200 to the first carrier body 110. The first coupling portion 111 according to the present embodiment may extend from an upper end of the first carrier body 110 in the width direction of the vehicle body V. The first coupling portion 111 may extend from the upper end of the first carrier body 110 in a direction toward a centerline VC of the vehicle body V. A through-hole may be formed in an end of the first coupling portion 111, penetrating the first coupling portion 111 in a vertical direction along the Z-axis. However, the shape of the first coupling portion 111 is not limited thereto and may be modified into various shapes through design changes, provided that the first coupling portion 111 can be coupled to the torsion beam axle 200.

The second coupling portion 112 may provide a connection point of the steering component 300 to the first carrier body 110. The second coupling portion 112 according to the present embodiment may extend from a side surface of the first carrier body 110 in the longitudinal direction of the vehicle body V. The second coupling portion 112 may extend toward the rear of the vehicle body V. A through-hole may be formed in an end of the second coupling portion 112, penetrating the second coupling portion 112 in the vertical direction along the Z-axis. However, the shape of the second coupling portion 112 is not limited thereto and may be modified into various shapes through design changes, provided that the second coupling portion 112 can be coupled to the steering component 300.

The second carrier body 120 may extend from the first carrier body 110 and form an external shape of a second side of the carrier 100.

The second carrier body 120 according to the present embodiment may extend from a lower end of the first carrier body 110 in a direction parallel to the width direction of the vehicle body V and toward the centerline VC of the vehicle body V. The specific shape of the second carrier body 120 is not limited to the shapes shown in FIGS. 2 and 3, and may be modified into various shapes through design changes.

A seating recess 121 may be formed in the second carrier body 120.

The seating recess 121 according to the present embodiment may have a recessed shape that is concavely depressed downward from an upper surface of the second carrier body 120. The cross-sectional shape of the seating recess 121 may be modified into various shapes, including an elliptical shape or a polygonal shape, in addition to a circular shape through design changes.

The torsion beam axle 200 may be spaced apart from the carrier 100 and may be connected to the vehicle body V. The torsion beam axle 200 may rotatably support the carrier 100. In other words, the torsion beam axle 200 may function as a configuration that guides the rotation of the carrier 100 during a steering operation of the wheel W.

The torsion beam axel 200 according to the present embodiment may include a torsion bar 210, a first trailing arm 220, a second trailing arm 230, and a steering joint 240.

The torsion bar 210 may form an external shape of a central portion of the torsion beam axle 200, and may be disposed to be spaced apart from the carrier 100. The torsion bar 210 may function as a configuration that absorbs pitching of the vehicle body V, which occurs during driving of the vehicle, by a torsional deformation of the torsion bar 210, and may enhance roll stiffness during turning of the vehicle, thereby securing turning stability.

The torsion bar 210 according to the present embodiment may be provided in the form of a bar disposed parallel to the width direction of the vehicle body V. The torsion bar 210 may have a length smaller than a distance between the pair of wheels W.

The torsion bar 210 may be disposed behind the carrier 100. In other words, the torsion bar 210 may be disposed at a position spaced by a predetermined distance rearward from the central axis C of the wheel W in the longitudinal direction of the vehicle body V. Accordingly, the torsion bar 210 allows for expansion of space in which a battery (not shown) is installed in the vehicle body V, thereby further improving the packaging efficiency of the battery. The specific shape of the torsion bar 210 is not limited to the shapes shown in FIGS. 2 to 4, and may be modified into various shapes through design changes.

The first trailing arm 220 may extend from the torsion bar 210, and may be connected to the vehicle body V. The first trailing arm 220 may support the torsion bar 210 with respect to the vehicle body V.

The first trailing arm 220 according to the present embodiment may be connected to an end of the torsion bar 210. The first trailing arm 220 may be secured to the end of the torsion bar 210 by various types of coupling methods, such as welding or bolting, and alternatively, may be integrally formed with the torsion bar 210. The first trailing arm 220 may extend rearward in the longitudinal direction of the vehicle body V from the end of the torsion bar 210.

An end of the first trailing arm 220 may be connected to the vehicle body V. The end of the first trailing arm 220 may be rotatably connected to the vehicle body V to absorb displacement generated during bump or rebound behavior of the wheel W. For example, the end of the first trailing arm 220 may be rotatably connected to the vehicle body V through a bushing, a bearing, a ball joint, or the like.

The first trailing arm 220 may be provided as a pair. The pair of first trailing arms 220 may be disposed to be spaced apart from each other in the width direction of the vehicle body V. The pair of first trailing arms 220 may be respectively connected to opposite ends of the torsion bar 210.

The second trailing arm 230 may extend from the torsion bar 210, and may be disposed to face the carrier 100. The second trailing arm 230 may be connected to the carrier 100 by the steering joint 240, which will be described later.

The second trailing arm 230 according to the present embodiment may be connected to an end of the torsion bar 210. The second trailing arm 230 may be secured to the end of the torsion bar 210 by various types of coupling methods, such as welding or bolting, and alternatively, may be integrally formed with the torsion bar 210. The second trailing arm 230 may extend forward in the longitudinal direction of the vehicle body V from the end of the torsion bar 210. In other words, the first trailing arm 220 and the second trailing arm 230 may be formed to extend in opposite directions from the end of the torsion bar 210.

An end of the second trailing arm 230 may be disposed to face the first coupling portion 11 of the carrier 100. For example, the end of the second trailing arm 230 may be positioned above the first coupling portion 111, and may be disposed to face the first coupling portion 111 along the steering axis A.

The second trailing arm 230 may be provided as a pair. The pair of second trailing arms 230 may be disposed to be spaced apart from each other in the width direction of the vehicle body V. The pair of second trailing arms 230 may be respectively connected to the opposite ends of the torsion bar 210.

The steering joint 240 may be positioned between the carrier 100 and the second trailing arm 230. Opposite ends of the steering joint 240 may be respectively connected to the carrier 100 and the second trailing arm 230. The steering joint 240 may rotatably support the carrier 100 with respect to the second trailing arm 230 about the steering axis A. Accordingly, during steering of the wheel W, the torsion beam axle 200 may remain stationary without rotating together with the wheel W.

Figure 5:
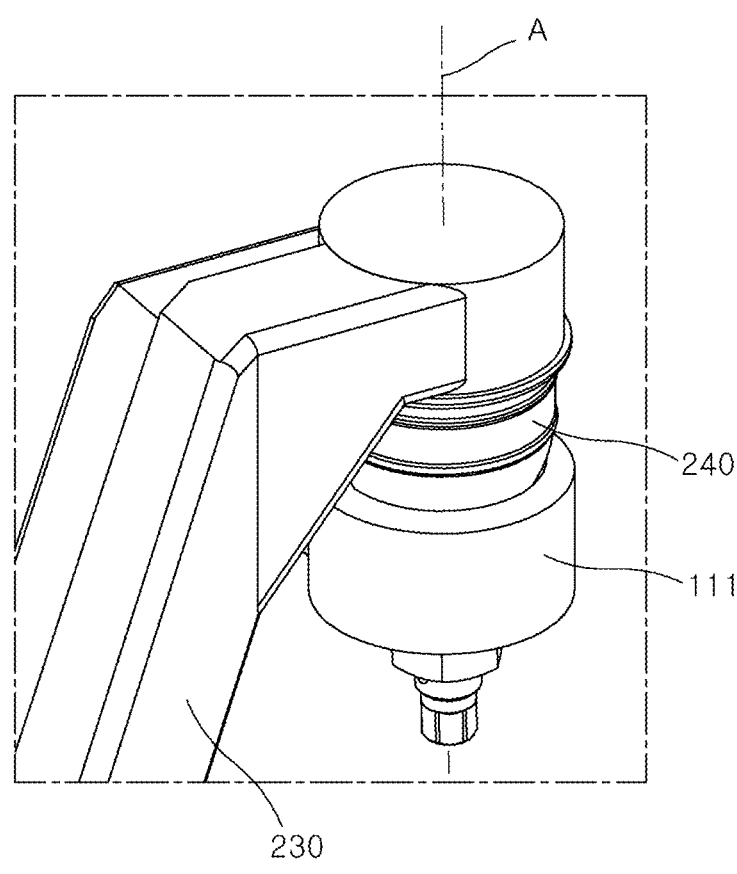
FIG. 5 is a diagram schematically illustrating a connection structure of a steering joint according to an embodiment of the present disclosure.

FIG. 5 is a diagram schematically illustrating a connection structure of the steering joint according to an embodiment of the present disclosure.

Referring to FIGS. 1 to 5, an upper end of a steering joint 240 according to the present embodiment may be coupled to the second trailing arm 230, and a lower end of the steering joint 240 may be coupled to the first coupling portion 111. A central axis of the steering joint 240 may be arranged to be coaxial with the steering axis A. The steering joint 240 may include a ball joint, which may be of various types, including a ball stud having an end with a spherical shape and a ball housing that rotatably accommodates the end of the ball stud. Accordingly, the steering joint 240 may absorb torsional loads generated between the second trailing arm 230 and the carrier 100 by a rotational operation of the steering joint 240, thereby facilitating a smooth steering operation of the wheel W.

The steering component 300 may be connected to the carrier 100, and may rotate the carrier 100 with respect to the torsion beam axle 200. In other words, the steering component 300 may function as a configuration that rotates the carrier 100 by a driving force of the steering component 300, thus generating a steering operation of the wheel W.

The steering component 300 may be provided as a pair. The pair of steering components 300 may be connected to different ones of the carriers 100, and may individually rotate the respective carriers 100 with respect to the torsion beam axle 200.

Figure 6:
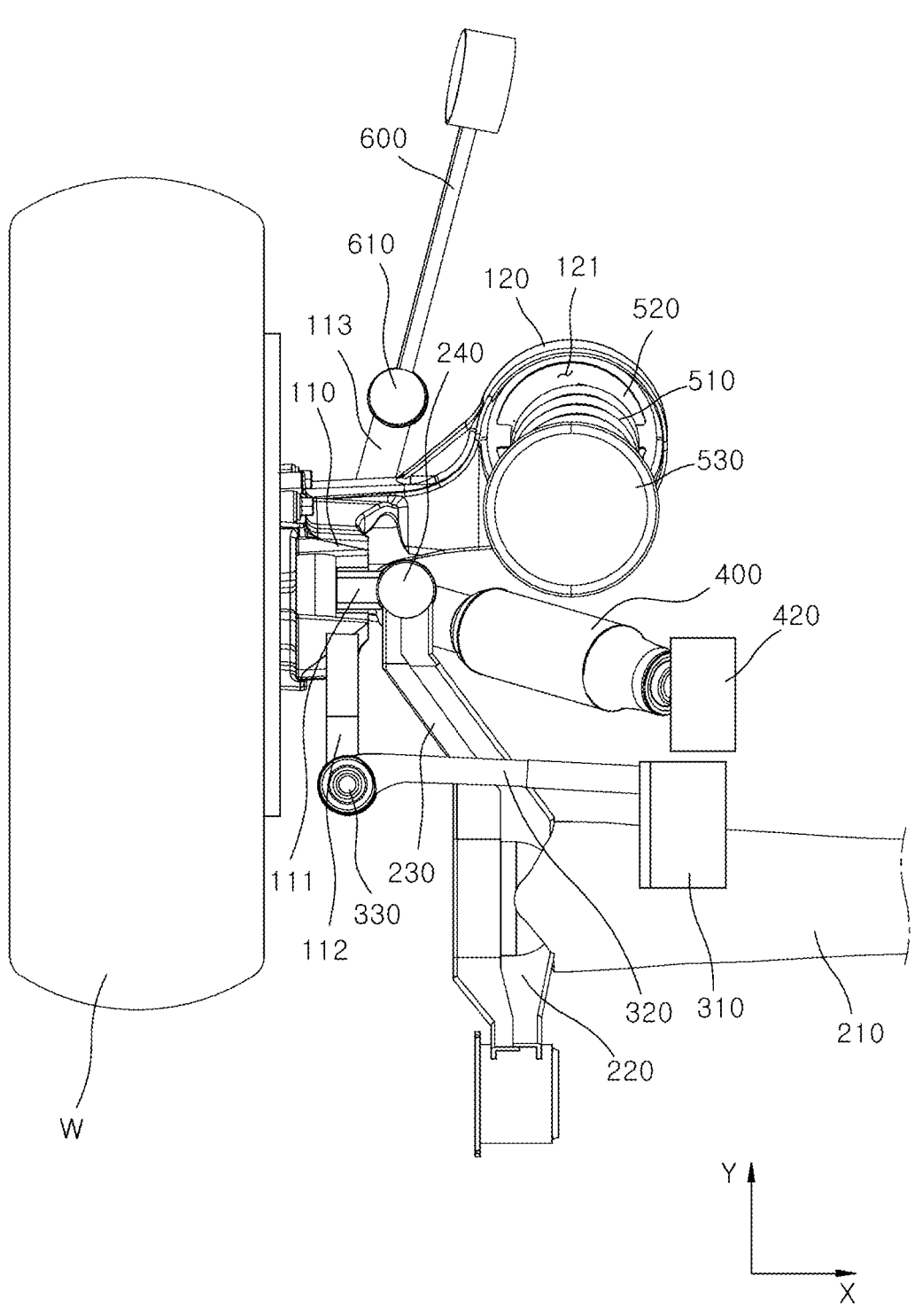
FIG. 6 is a plan view schematically illustrating a configuration of a steering component according to an embodiment of the present disclosure.
Figure 7:
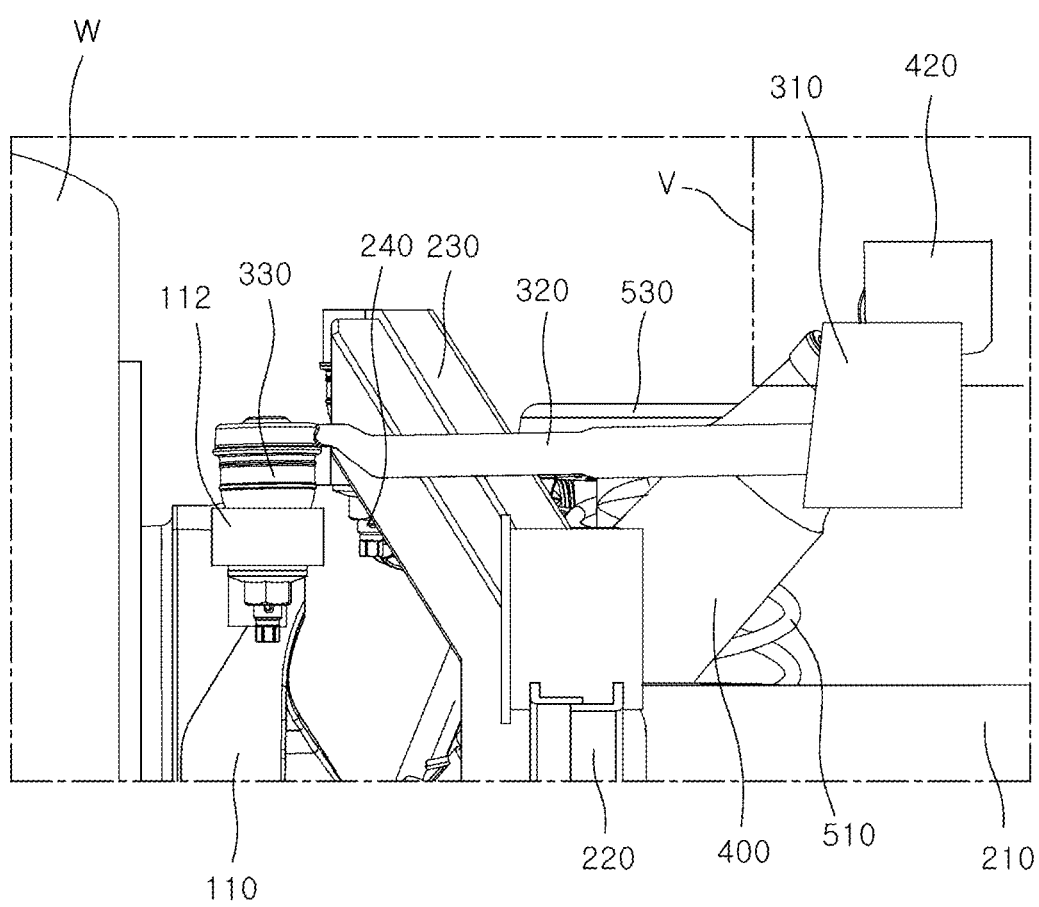
FIG. 7 is a side view schematically illustrating a configuration of the steering component according to an embodiment of the present disclosure.

FIG. 6 is a plan view schematically illustrating a configuration of the steering component according to an embodiment of the present disclosure. FIG. 7 is a side view schematically illustrating a configuration of the steering component according to an embodiment of the present disclosure.

Referring to FIGS. 1 to 7, the steering component 300 according to an embodiment may include a steering actuator 310, a tie rod 320, and a conversion joint 330.

The steering actuator 310 may generate a driving force for the steering operation of the wheel W.

The steering actuator 310 according to the present embodiment may include a power device, such as an electric motor or a hydraulic cylinder, capable of generating a driving force using power or pressure received from an external source, and a power transmission device, such as a ball screw or a rack gear, capable of converting the driving force of the power device into a linear reciprocating motion of the tie rod 320.

The steering actuator 310 may be disposed to be spaced apart from the carrier 100. The steering actuator 310 may be secured to the vehicle body V at a position above the carrier 100. The steering actuator 310 may be secured to the vehicle body V through various types of coupling methods, such as bolting, welding, or press-fit coupling.

The tie rod 320 may transmit the driving force generated from the steering actuator 310 to the carrier 100.

The tie rod 320 according to the present embodiment may be disposed between the steering actuator 310 and the carrier 100. A first end of the tie rod 320 may be connected to the power transmission device of the steering actuator 310. A second end of the tie rod 320 may be disposed to face the second coupling portion 112 along the Z-axis at a position above the second coupling portion 112 of the carrier 100. The second end of the tie rod 320 may be connected to the second coupling portion 112 by the conversion joint 330, which will be described later. The tie rod 320 may receive a driving force from the steering actuator 310 and linearly reciprocate in a direction parallel to the width direction of the vehicle body V.

The tie rod 320 may be disposed parallel to the torsion bar 210. In other words, the tie rod 320 may be disposed parallel to the width direction of the vehicle body V. Accordingly, the tie rod 320 may support the carrier 100 in a direction parallel to the width direction of the vehicle body V, thereby more effectively reducing reaction moments and loads acting between the carrier 100 and the torsion beam axle 200.

The conversion joint 330 may be disposed between the carrier 100 and the tie rod 320. The conversion joint 330 may have opposite sides respectively connected to the carrier 100 and the tie rod 320. The conversion joint 330 may convert a linear reciprocating motion of the tie rod 320 into a rotational motion of the carrier 100. That is, the conversion joint 330 may function as a configuration that ultimately transmits the driving force generated from the steering actuator 310 to the carrier 100, thereby generating a steering operation of the wheel W.

Figure 8:
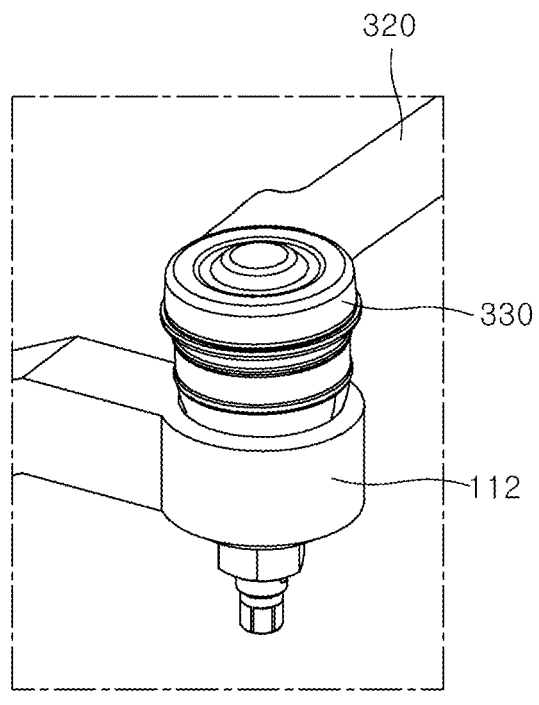
FIG. 8 is a diagram schematically illustrating a connection structure of a conversion joint according to an embodiment of the present disclosure.

FIG. 8 is a diagram schematically illustrating a connection structure of the conversion joint according to an embodiment of the present disclosure.

Referring to FIG. 8, an upper end of the conversion joint 330 according to the present embodiment may be coupled to the tie rod 320, and a lower end of the conversion joint 330 may be coupled to the second coupling portion 112. A central axis of the conversion joint 330 may be arranged parallel to a central axis the steering joint 240. In other words, the central axis of the conversion joint 330 may be arranged parallel to the steering axis A.

The conversion joint 330 may include a ball joint, which may be of various types, including a ball stud having an end with a spherical shape and a ball housing that rotatably accommodates the end of the ball stud. Accordingly, the conversion joint 330 may absorb torsional loads generated between the tie rod 320 and the carrier 100 through a rotational operation of the conversion joint 330, thereby facilitating a smooth steering operation of the wheel W.

The suspension apparatus 1 according to the present embodiment may further include a shock absorber 400.

The shock absorber 400 may be disposed between the carrier 100 and the vehicle body V. The shock absorber 400 may attenuate the magnitude of vibrations or impacts transmitted from the road surface to the wheel W.

Figure 9:
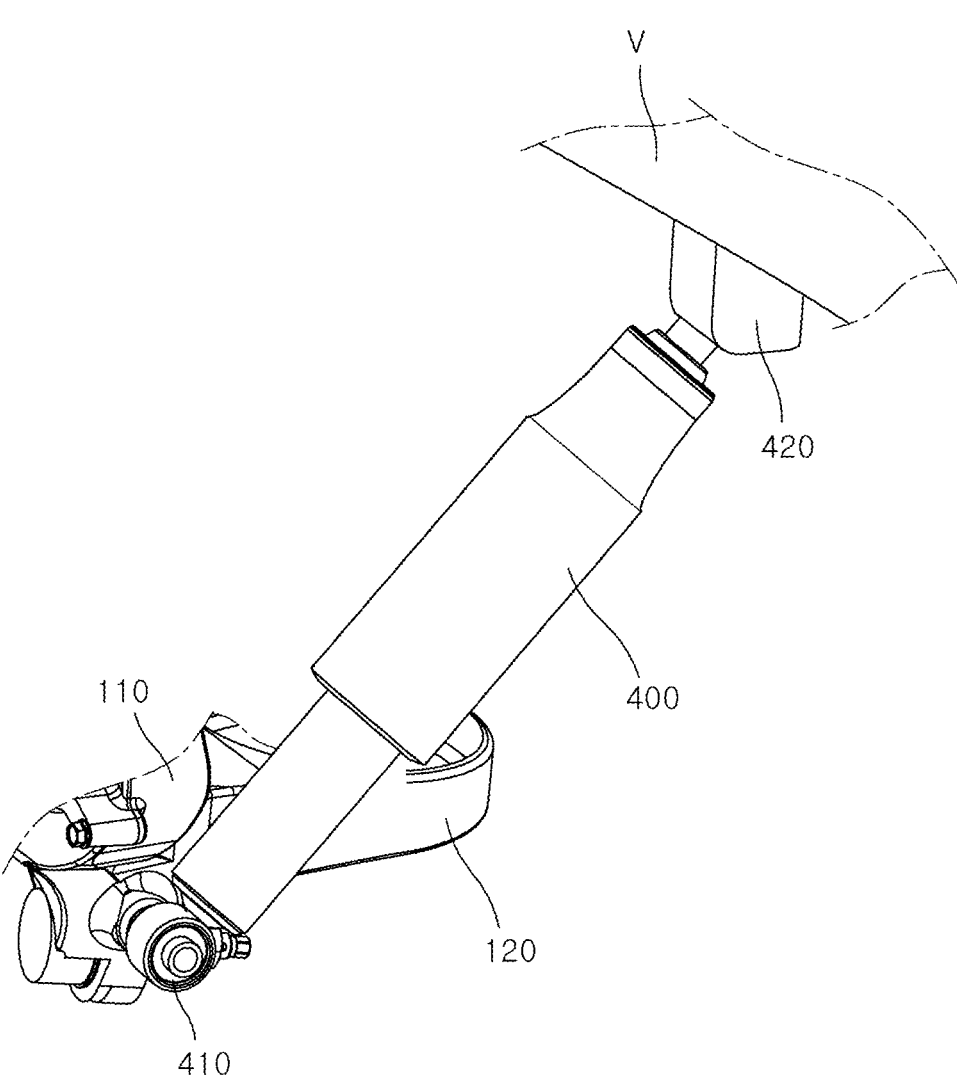
FIG. 9 is a diagram schematically illustrating a configuration of a shock absorber according to an embodiment of the present disclosure.

FIG. 9 is a diagram schematically illustrating a configuration of the shock absorber according to an embodiment of the present disclosure.

The shock absorber 400 according to the present embodiment may be exemplified as various types of damping devices in which gas, oil, or the like is filled inside and that can generate a damping force through an expansion and contraction operation.

A first connection portion 410, which is connected to the carrier 100, may be formed on a lower end of the shock absorber 400.

The first connection portion 410 according to the present embodiment may be connected to the first carrier body 110. For example, the first connection portion 410 may include a bushing formed of an inner body and an outer body arranged concentrically in a ring shape, and an elastic element disposed between the inner body and the outer body. Accordingly, the first connection portion 410 may absorb torsional loads acting between the first carrier body 110 and the shock absorber 400 by the elastic restoring force of the elastic element.

A second connection portion 420, which is connected to the vehicle body V, may be formed on an upper end of the shock absorber 400.

The second connection portion 420 according to the present embodiment may be connected to a lower side of the vehicle body V. For example, the second connection portion 420 may include a ball joint, which may be of various types, including a ball stud having an end with a spherical shape and a ball housing that rotatably accommodates the end of the ball stud. In the case in which the carrier 100 is rotated relative to the vehicle body V by the steering operation of the wheel W, the second connection portion 420 may absorb torsional loads acting on opposite ends of the shock absorber 400, through multi-axis rotation of the ball joint, thereby preventing damage to the shock absorber 400.

While the above description provides an example in which the second connection portion 420 includes a ball joint, the present disclosure is not limited thereto. The first connection portion 410 may include a ball joint, or both the first connection portion 410 and the second connection portion 420 may include ball joints.

The suspension apparatus 1 according to the present embodiment may further include an elastic element 500.

The elastic element 500 may be disposed between the carrier 100 and the vehicle body V, and may elastically support the carrier 100 with respect to the vehicle body V. The elastic element 500 may function as a configuration that generates a load in a direction opposite to the movement of the wheel W through elastic deformation during the bump behavior of the wheel W, thereby maintaining road contact of the wheel W and absorbing impacts transmitted from the road surface.

Figure 10:
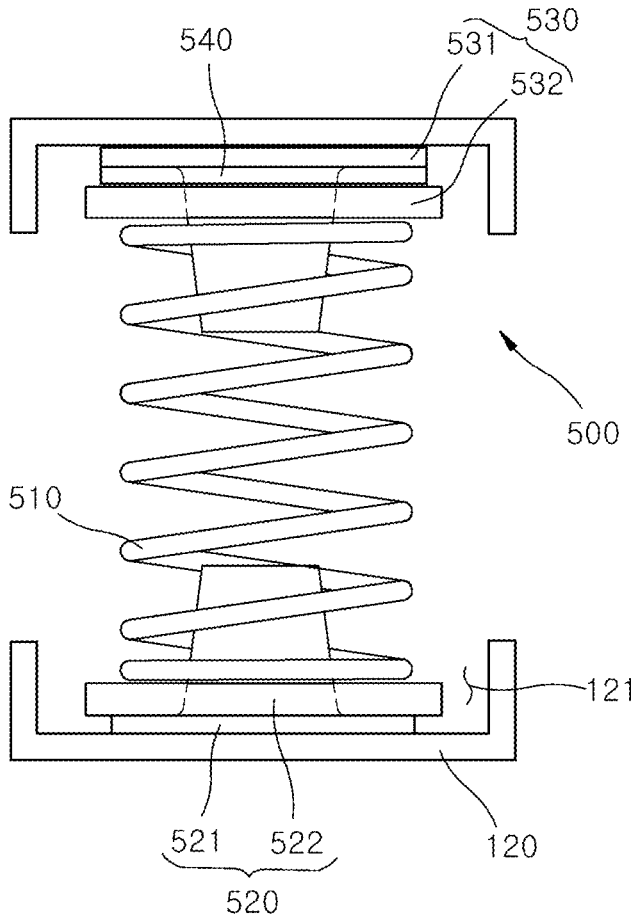
FIG. 10 is a diagram schematically illustrating a configuration of an elastic element according to an embodiment of the present disclosure.

FIG. 10 is a diagram schematically illustrating a configuration of the elastic element according to an embodiment of the present disclosure.

Referring to FIG. 10, the elastic element 500 according to the present embodiment may include a spring 510, a first support 520, and a second support 530.

The spring 510 according to the present embodiment may be provided in the form of a coil spring that is extendable and contractible in a longitudinal direction. A lower end of the spring 510 may be inserted into the seating recess 121, and may be placed to face a bottom surface of the seating recess 121. An upper end of the spring 510 may be disposed to face a lower surface of the vehicle body V. The longitudinal direction of the spring 510 may be arranged parallel to the steering axis A, and may also be arranged to be inclined at a predetermined angle with respect to the steering axis A.

The first support 520 may fasten the lower end of the spring 510 to the carrier 100.

The first support 520 according to the present embodiment may include a first cup 521 and a first seat 522.

The first cup 521 may be disposed between the lower end of the spring 510 and the bottom surface of the seating recess 121. The first cup 521 may be inserted into the seating recess 121. The first cup 521 may be secured to the bottom surface of the seating recess 121 through various types of coupling methods, such as welding or bolting. The first cup 521 may have a shape in which a central portion thereof protrudes upward. The central portion of the first cup 521 may be inserted into the spring 510.

The first seat 522 may be disposed between the lower end of the spring 510 and the first cup 521.

The first seat 522 according to the present embodiment may have a plate shape that is disposed coaxially with the first cup 521. An upper surface of the first seat 522 may be secured to the lower end of the spring 510. The central portion of the first cup 521 may pass through a central portion of the first seat 522. A lower surface of the first seat 522 may be seated on an upper surface of the first cup 521, and may be secured to the upper surface of the first cup 521.

The shape of the first support 520 is not limited to the above-described configuration and may be variously modified through design changes within the technical spirit of a shape that allows securing the lower end of the spring 510 to the carrier 100.

The second support 530 may fasten the upper end of the spring 510 to the vehicle body V.

The second support 530 according to the present embodiment may include a second cup 531 and a second seat 532.

The second cup 531 may be disposed between the upper end of the spring 510 and the lower surface of the vehicle body V. The second cup 531 may be secured to the lower surface of the vehicle body V through various types of coupling methods, such as welding or bolting. The second cup 531 may have a shape in which a central portion thereof protrudes downward. The central portion of the second cup 531 may be inserted into the spring 510.

The second seat 532 may be disposed between the upper end of the spring 510 and the second cup 531.

The second seat 532 according to the present embodiment may have a plate shape that is disposed coaxially with the second cup 531. A lower surface of the second seat 532 may be secured to the upper end of the spring 510. The central portion of the second cup 531 may pass through a central portion of the second seat 532. An upper surface of the second seat 532 may be disposed to face a lower surface of the second cup 531.

The suspension apparatus 1 according to the present embodiment may further include a bearing 540.

The bearing 540 may rotatably support the elastic element 500 with respect to the vehicle body V. Accordingly, in the case in which the carrier 100 is rotated relative to the vehicle body V by the steering operation of the wheel W, the bearing 540 may absorb torsional loads acting on opposite ends of the elastic element 500, through a rotational operation of the bearing 540, thereby preventing damage to the elastic element 500.

The bearing 540 according to the present embodiment may be disposed between the second cup 531 and the second seat 532. A central axis of the bearing 540 may be arranged coaxially with central axes of the second cup 531 and the second seat 532. An upper side of the bearing 540 may be secured to the lower surface of the second cup 531, and a lower side of the bearing 540 may be secured to the upper surface of the second seat 532. The bearing 540 may include a thrust bearing, upper and lower ends of which are capable of relative rotation about a central axis thereof. Accordingly, in the case where a torsional load about the central axis of the spring 510 is generated due to the relative rotation of the carrier 100 with respect to the vehicle body V, the upper end of the spring 510 may rotate relative to the vehicle body V, thereby offsetting the torsional load.

While the above description provides an example in which the bearing 540 is positioned between the second cup 531 and the second seat 532, the location of the bearing 540 is not limited thereto. The bearing 540 may also be positioned between the second cup 531 and the vehicle body V, between the first cup 521 and the second cup 531, or between the first cup 521 and the seating recess 121.

The suspension apparatus 1 according to the present embodiment may further include a link arm 600 and a link joint 610.

The link arm 600 may be connected to the carrier 100, and may support the carrier 100 with respect to the vehicle body V. The link arm 600 may function as a configuration that provides additional supporting force to the carrier 100 separately from the torsion beam axle 200.

The link arm 600 according to the present embodiment may be provided in the form of a suspension link that can be of various types. The link arm 600 may be disposed to face the torsion beam axle 200 with the carrier 100 interposed therebetween. For example, the link arm 600 may be disposed on a front side of the vehicle body V based on the carrier 100, and may be disposed on the rear side of the vehicle body V based on the torsion beam axle 200. A first end of the link arm 600 may be connected to the vehicle body V by a ball joint, a bushing, or the like. A second end of the link arm 600 may be connected to the carrier 100 by the link joint 610.

The link joint 610 may be disposed between the carrier 100 and the link arm 600. The link joint 610 may have opposite sides respectively connected to the carrier 100 and the link arm 600. The link joint 610 may guide relative movement between the carrier 100 and the link arm 600 during the bump and rebound behavior of the wheel W or the steering operation of the wheel W, and may absorb torsional loads caused by the relative movement between the carrier 100 and the link arm 600.

Figure 11:
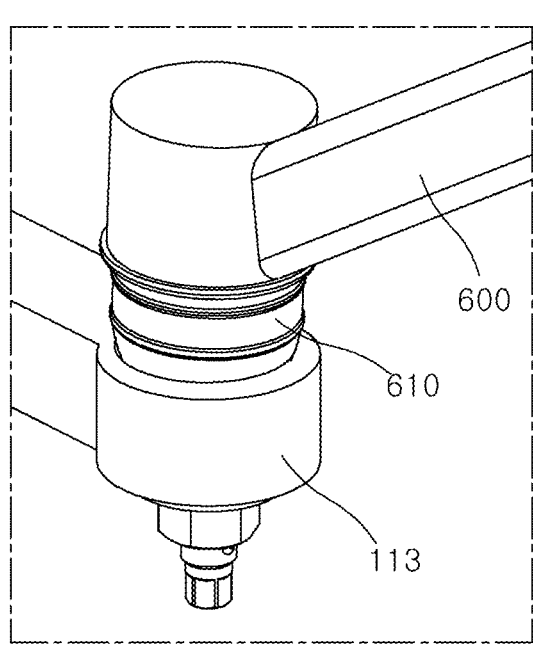
FIG. 11 is a diagram schematically illustrating a connection structure of a link joint according to an embodiment of the present disclosure.

FIG. 11 is a diagram schematically illustrating a connection structure of the link joint according to an embodiment of the present disclosure.

Referring to FIGS. 1 to 11, the carrier 100 according to the present embodiment may further include a third coupling portion 113.

The third coupling portion 113 according to the present embodiment may extend from the lower end of the first carrier body 110 toward the second end of the link arm 600. The third coupling portion 113 and the second end of the link arm 600 may be disposed to face each other in the vertical direction. For example, the second end of the link arm 600 may be disposed above the third coupling portion 113. A through-hole may be formed in an end of the third coupling portion 113, penetrating the third coupling portion 113 in the vertical direction along the Z-axis.

An upper end of the link joint 610 according to the present embodiment may be coupled to the second end of the link arm 600. A lower end of the link joint 610 may be coupled to the third coupling portion 113. A central axis of the link joint 610 may be arranged to be coaxial with the steering axis A. The link joint 610 may include a ball joint, which may be of various types, including a ball stud having an end with a spherical shape and a ball housing that rotatably accommodates the end of the ball stud. Accordingly, the link joint 610 may absorb torsional loads generated between the link arm 600 and the carrier 100 through a rotational operation of the link joint 610, thereby preventing damage to the link arm 600, and facilitating a smooth steering operation of the wheel W.

Hereinafter, an operation process of the suspension apparatus 1 according to an embodiment of the present disclosure will be described.

Figure 12:
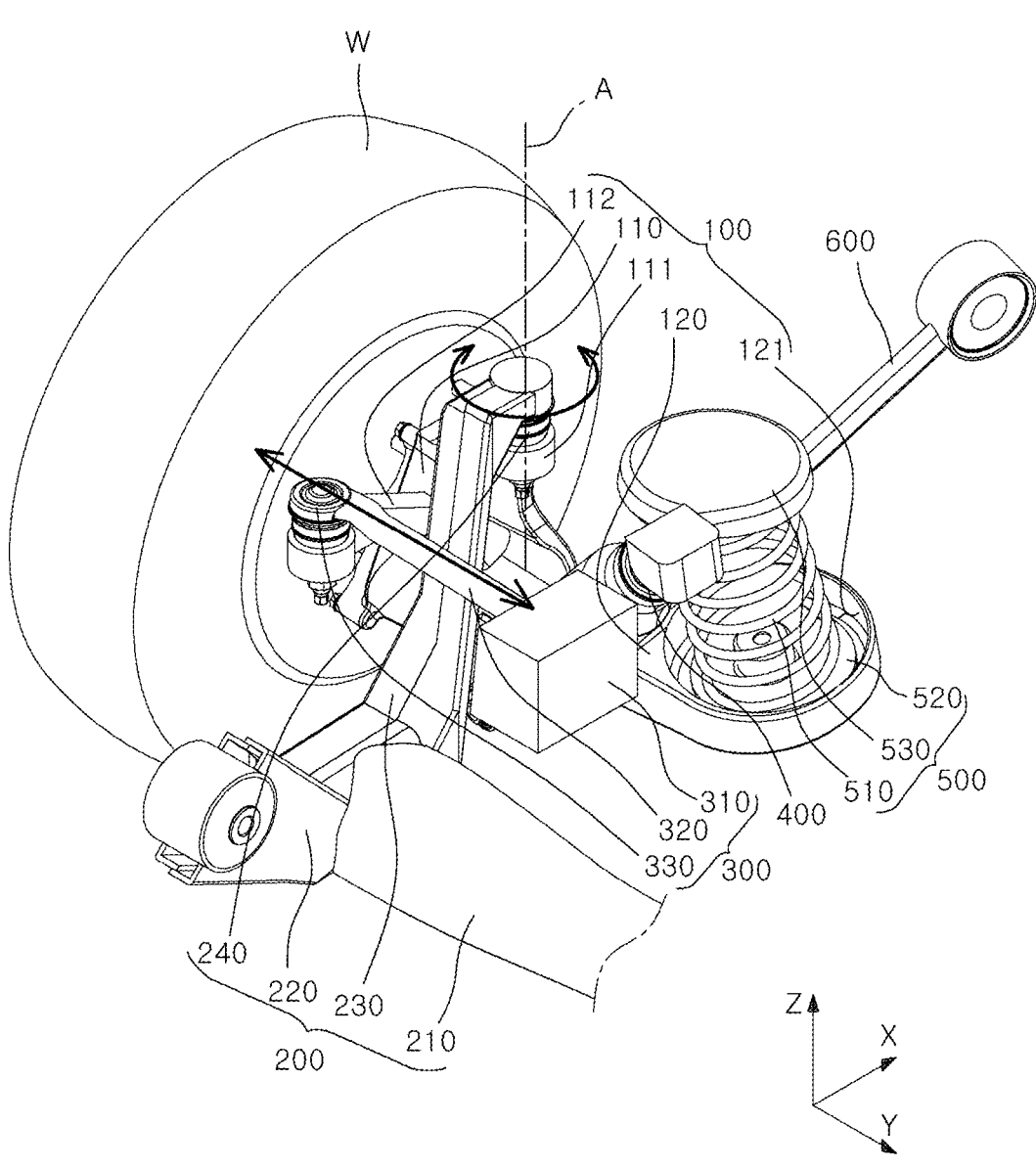
FIG. 12 is a diagram schematically illustrating an operational state of the suspension apparatus according to an embodiment of the present disclosure.

FIG. 12 is a diagram schematically illustrating an operational state of the suspension apparatus according to an embodiment of the present disclosure.

Referring to FIG. 12, when steering of the wheel W is required during vehicle driving, the steering actuator 310 generates a driving force.

The tie rod 320 is linearly moved along the width direction of the vehicle body V by the driving force generated from the steering actuator 310.

The conversion joint 330 transmits a load generated by the linear motion of the tie rod 320 to the carrier 100.

The carrier 100 rotates in a clockwise or counterclockwise direction about the steering axis A, adjusting the steering angle of the wheel W.

During the foregoing process, the steering joint 240, the conversion joint 330, and the link joint 610 undergo multi-axis rotation due to relative position changes of the second trailing arm 230, the tie rod 320, and the link arm 600 with respect to the carrier 100, thereby facilitating a smooth steering operation of the wheel W.

Furthermore, the second connection portion 420 and the bearing 540 may absorb, through rotational operations thereof, torsional loads generated at the opposite ends of the shock absorber 400 and the opposite ends of the elastic element 500 due to the relative rotation of the carrier 100 with respect to the vehicle body V.

According to the present disclosure, rear-wheel steering is enabled by a steering component that relatively rotates a carrier with respect to a vehicle body and a torsion beam axle.

According to the present disclosure, a smooth steering operation of a wheel can be achieved through a ball joint and a bearing, thereby preventing damage to components caused by torsional load.

According to the present disclosure, as a tie rod is disposed parallel to a width direction of the vehicle body, lateral rigidity of the carrier can be increased, and reaction moment and load that act on a connection point between the carrier and the torsion beam axle can be reduced.

While the present disclosure has been described with reference to the specific embodiments illustrated in the attached drawings, this is only for illustrative purposes, and it will be apparent to those skilled in the art that various modifications and other equivalent embodiments may be made based on the embodiments. Therefore, the true technical scope of the present disclosure should be defined by the following claims.

What is claimed is:

1. A suspension apparatus comprising:
a carrier connected to a wheel;
a torsion beam axle connected to a vehicle body, and configured to rotatably support the carrier; and
a steering component connected to the carrier, and configured to rotate the carrier relative to the torsion beam axle,
wherein the torsion bear axle comprises:
a torsion bar spaced apart from the carrier, and disposed parallel to a width direction of the vehicle body;
a first trailing arm extending form the torsion bar, and connected to the vehicle body;
a second trailing arm extending from the torsion bar, and disposed to face the carrier; and
a steering joint disposed between the carrier and the second trailing arm,
wherein the steering joint includes a ball joint.

2. The suspension apparatus of claim 1, wherein the torsion bar is disposed behind the carrier.

3. The suspension apparatus of claim 1, wherein the steering component comprises:
a steering actuator spaced apart from the carrier, and configured to generate a driving force;
a tie rod disposed between the steering actuator and the carrier, and configured to receive the driving force from the steering actuator and to reciprocate; and
a conversion joint disposed between the carrier and the tie rod, and configured to convert the reciprocation of the tie rod into a rotational motion of the carrier.

4. The suspension apparatus of claim 3, wherein the tie rod is disposed parallel to the torsion bar.

5. The suspension apparatus of claim 3, wherein the conversion joint includes a ball joint.

6. The suspension apparatus of claim 3, wherein a central axis of the steering joint is parallel to a center axis of the conversion joint.

7. The suspension apparatus of claim 1, further comprising a shock absorber including a first connection portion connected to the carrier and a second connection portion connected to the vehicle body.

8. The suspension apparatus of claim 7, wherein at least one of the first connection portion and the second connection portion includes a ball joint.

9. The suspension apparatus of claim 1, further comprising an elastic element disposed between the carrier and the vehicle body, and configured to elastically support the carrier with respect to the vehicle body.

10. The suspension apparatus of claim 9, wherein the carrier comprises:

a first carrier body disposed to face the wheel; and a second carrier body extending form the first carrier body, and including a seating recess in which an end of the elastic element is seated.

11. The suspension apparatus of claim 9, further comprising a bearing configured to rotatably support the elastic element with respect to the vehicle body.

12. The suspension apparatus of claim 1, further comprising:

a link arm disposed to face the torsion beam axle with the carrier interposed therebetween; and a link joint disposed between the link arm and the carrier.

13. The suspension apparatus of claim 12, wherein the link joint includes a ball joint.

14. A suspension apparatus comprising:

a carrier connected to a wheel;

a torsion beam axle connected to a vehicle body, and configured to rotatably support the carrier;

a steering component connected to the carrier, and configured to rotate the carrier relative to the torsion beam axle; and a shock absorber including a first connection portion connected to the carrier and a second connection portion connected to the vehicle body, wherein at least one of the first connection portion and the second connection portion includes a ball joint.

15. A suspension apparatus comprising:

a carrier connected to a wheel;

a torsion beam axle connected to a vehicle body, and configured to rotatably support the carrier;

a steering component connected to the carrier, and configured to rotate the carrier relative to the torsion beam axle;

an elastic element disposed between the carrier and the vehicle body, and configured to elastically support the carrier with respect to the vehicle body; and a bearing configured to rotatably support the elastic element with respect to the vehicle body.

* * * * *